SEMICONDUCTIVE PIEZOELECTRIC CERAMICS AND METHOD FOR MAKING THE SAME
Filed Oct. 21, 1968
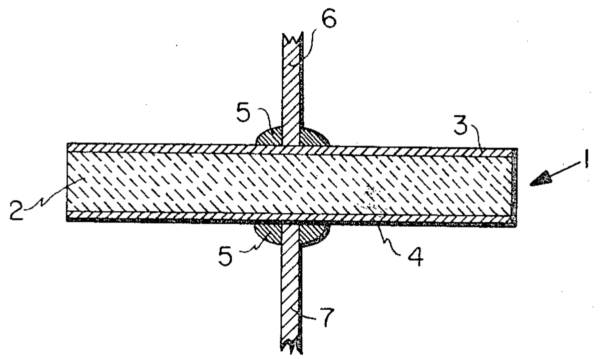
INVENTOR
H IKUSHIMA
S HAYAKAWA
BY Wenderoth, Lind & Ponack
ATTORNEY

United States Patent Office 3,553,134
Patented Jan. 5, 1971

3,553,134

SEMICONDUCTIVE PIEZOELECTRIC CERAMICS AND METHOD FOR MAKING THE SAME

Hiroshi Ikushima and Shigeru Hayakawa, Osaka, Japan, assignors to Matsushita Electric Industrial Co., Ltd., Osaka, Japan Filed Oct. 21, 1968, Ser. No. 769,230
Claims priority, application Japan, Oct. 26, 1967, 42/70,049
Int. Cl. C04b *35/46, 35/48;* H01v *7/02*
U.S. Cl. 252—62.9 2 Claims

ABSTRACT OF THE DISCLOSURE

Semiconductive ceramics of the formula $$Pb(Mg_{1/3}Nb_{2/3})_xTi_yZr_zO_3(x+y+z=1)$$

wherein Pb is replaced in part by a metal selected from the group consisting of Gd, Sm, Nd, Ce, La, Bi and Sb are characterized by low specific resistivity and superior electromechanical transducing properties. The ceramics are useful as elements of ultrasonic travelling-wave devices, e.g. an ultrasonic delay line element, an ultrasonic travelling wave amplifier, element, etc.

The present invention relates to semiconductive piezoelectric ceramics and method for making the same.

Recently it has been disclosed that a single crystal of CdS has high piezoelectric properties as well as low electrical resistivity and can be used as an element of an ultrasonic amplifier. Such disclosure has made it an art desideratum to produce an electromechanical transducer consisting of ceramic material, in view of the low cost.

The prior literature has disclosed that barium titanate becomes semiconductive when incorporated with a small amount of rare earth metal oxide or fired in a reducing gas atmosphere. However, these semiconductive barium titanate ceramics scarcely exhibit piezoelectric properties.

An object of the present invention is to provide a semiconductive piezoelectric ceramic element having a low specific resistivity and superior electromechanical transducing properties.

Another object of the present invention is to provide a method for making a semiconductive piezoelectric ceramic element having a low specific resistivity and superior electromechanical transducing properties.

These and other objects of the present invention will be apparent upon consideration of the following description taken together with the accompanying drawing in which the single figure is a cross-sectional view of a transducer comprising a ceramic body according to the present invention.

Before proceeding with a detailed description of the semiconductive piezoelectric ceramic materials contemplated by the invention, their application in electromechanical transducers will be described with reference to the aforesaid drawing wherein reference characer 1 designates, as a whole, an electromechanical transducer having, as its active element, a preferably disc-shaped body 2 of semiconductive piezoelectric ceramic material according to the present invention.

Body 2 is electrically polarized, in a manner hereinafter set forth, and is, provided with a pair of ohmic electrodes 3 and 4, applied in a suitable and per se conventional manner, on two opposite surfaces thereof. Lead wires 6 and 7 are attached to the ohmic electrodes 3 and 4 respectively by means of solder 5. When the ceramic body is subjected to shock, vibration, or other mechanical stress, electrical output generated can be taken from the lead wires 6 and 7.

An electromechanical transducer element according to the present invention comprises a polycrystalline ceramic body consisting essentially of $Pb(Mg_{1/3}Nb_{2/3})_xTi_yZr_zO_3$ and 0.1 to 0.5 atomic percent of rare earth metal or bismuth or antimony which replaces Pb, wherein $x$=0.125 to 0.375
$y$=0.375 to 0.435
$z$=0.25 to 0.44 and
$x+y+z=1$.

said rare earth metal is a metal selected from the group consisting of Gd, Sm, Nd, Ce and Ia.

It has been discovered according to the present invention that said polycrystalline ceramic body has a low electrical resistivity of $10^3$ to $10^7$ Ω-cm. at room temperature (15 to 30° C.) when fired at a temperature of 1150° C. to 1350° C. for a time period of 10 minutes to 3 hours in a firing atmosphere having an oxygen partial pressure less than 0.2, advantageously less than 0.05, atmospheric pressure. Optimum results can be obtained by using a firing atmosphere having substantially no oxygen partial pressure.

The scope of the present invention will be understood more clearly upon consideration of the following description with reference to examples according to the invention.

A mixture of PbO, MgO, $Nb_2O_5$, $TiO_2$, $ZrO_2$ corresponding to the base compositions which are expressed by the chemical formula $Pb(Mg_{1/2}Nb_{2/3})_xTi_yZr_zO_3$ ($0.125 \leqq y \leqq 0.375$; $0.375 \leqq y \leqq 0.435$; $x+y+z=1$), and an oxide of said rare earth metals, Bi or Sb, the amount of the additive oxide ranging from 0.1 to 0.5 atomic percent, is intimately mixed in a ball-mill using an appropriate amount of water in per se well known manner. After mixing and drying, the mixture is pressed into desired forms, for example, pellets of 50 mm. diameter and 30 mm. thickness, under any suitable pressure, for example, 300 kg. per cem.². The pressed pellets are calcined at any suitable temperature, for example, at 850° C. for 2 hours in air. The calcined pellets are crushed by ball-milling. After crushing and drying, the calcined powders are pressed into desired form, for example, pellets of 10 mm. diameter and 1 mm. thickness under any suitable pressure, for example, 750 kg. per cm.².

The pressed pellets are fired at 1150° C. to 1350° C. for a time period of 10 minutes to 3 huors in a firing atmosphere having an oxygen partial pressure less than 0.2 atmospheric pressure in accordance with the present invention. The firing is carried out under any suitable condition, for example, at a heat-up and cooling rate of 300° C. per hour. During the heat-up, soaking and cooling process, the atmosphere surrounding the pellets is established advantageously by a current of an oxygen-deficient gas flowing at a rate of from 20 to 100 milliliters per minute.

Thus obtained solid solution ceramic body of the compositions $Pb(Mg_{1/3}Nb_{2/3})_xTi_yZr_zO_3$ with a small amount of rare earth metal or Bi or Sb which replaces the equivalent atomic percent of Pb is polished down to 0.4 mm. in thickness and is provided, at both flat surfaces, with ohmic electrodes. Operable ohmic electrode is In-Ga alloy, electrochemically deposited nickel metal or vacuum evaporated silver in accordance with the present invention. The electroded ceramic body is polarized by imparting a high D.C. (direct current) field. It is necessary that the electroded ceramic body having an electrical resistivity less than $10^6$ Ω-cm. is polarized at a temperature at which the ceramic body shows a resistivity high enough to be polarized by said high D.C. field. Said ceramic body shows a great increase in resistivity with a decrease in the temperature. It is advantageous that a ceramic body having low electrical resistivity of $10^3$ Ω-cm. at room temperature is polarized at liquid nitrogen temperature.

As a matter of convenience, the planar coupling factor, $K_p$ defined by IRE method (cf. I.R.E. Standards on Piezoelectric Crystals: Proc. IRE 49, 116 (1961)) is taken as a measure of piezoelectric properties. The dielectric properties and specific resistivity at room temperature of the ceramic body are measured by per se well-known conventional methods, respectively.

Now, it is well known that the following criteria for piezoelectricity and electrical conduction in semiconductive piezoelectric materials are applicable when the angular frequency of the concerned signal ($\omega$) is much less than $10^{10}$ c./s. Namely, when $\omega/\omega_c \gg 1$, piezoelectricity is dominant; electrical conduction is dominant when $\omega/\omega_c \ll 1$. Here, $\omega_c$ is "conductivity frequency" ($\sigma/\epsilon$) of said material where $\sigma$ and $\epsilon$ is specific conductivity in $\Omega^{-1}$ cm.$^{-1}$ and dielectric constant in F-cm.$^{-1}$, respectively. Thus, for example, in the case of a specimen whose electrostatic dielectric constant and specific resistivity are nearly $10^4$ and $10^3$ $\Omega$-cm., respectively, it is desirable to use the piezoelectricity in the frequency above $10^6$ c./s.

While there have been described presently preferred illustrative examples of this invention, various changes and modifications can be made therein without departing from the invention. It is intended, therefore, to cover in the appended claims all such changes and modifications as fall within the true spirit and scope of the invention.

EXAMPLE 1

Mixtures in compositions shown in Tables 1, 2 and 3 are mixed, calcined and pressed at 750 kg./cm.$^2$ into discs in a way similar to that described above. The pressed discs are fired at 1250° C. for 1 hour in nitrogen gas. The fired discs are provided, at the surfaces, with In-Ga alloy electrodes and polarized in a manner similar to that described in the foregoing description. The planar coupling factor, electrostatic dielectric constant, dielectric loss factor and specific resistivity are measured at room temperature in accordance with the preceding description and are shown in Tables 1, 2 and 3.

EXAMPLE 2

Mixtures in composition shown in Table 4 are fabricated into pressed discs in a way similar to that of Example 1. The sample number of Table 4 corresponds to that of Tables 1, 2 and 3. The pressed discs are fired at 1250° C. for 1 hour in various atmospheres as shown in Table 4. The fired discs are provided with In-Ga alloy electrodes and polarized in a manner similar to that of Example 1. The planar coupling factor, electrostatic dielectric constant, dielectric loss factor and specific resistivity measured at room temperature in a way similar to that of Example 1 are shown in Table 4.

TABLE 1

| Sample No. | Basic composition | Addition amount of additives, atomic percent | Planar coupling factor, percent | Electrostatic dielectric constant | Dielectric loss factor | Specific resistivity, Ω-cm. |
|---|---|---|---|---|---|---|
| G-A-1 | $Pb(Mg_{1/3}Nb_{2/3})_{0.375}Ti_{0.375}Zr_{0.25}O_3$ | Gd: 0 | 50–55 | 3, 500–4, 000 | 0. 02–0. 05 | $10^7$ |
| G-A-2 | Same as above | Gg: 0. 1 | 30–40 | 10, 000–25, 000 | 0. 50–0. 60 | $10^3$–$10^5$ |
| G-A-3 | do | Gd: 0. 5 | 40–45 | 10, 000–20, 000 | 0. 40–0. 60 | $10^4$–$10^6$ |
| G-A-4 | do | Gd: 2. 0 | 45–50 | 8, 000–15, 000 | 0. 10–0. 40 | $10^5$–$10^7$ |
| G-A-5 | do | Gd: 5. 0 | 50–55 | 4, 000–5, 000 | 0. 50–0. 10 | $10^8$ |
| G-B-1 | $Pb(Mg_{1/3}Nb_{2/3})_{0.25}Ti_{0.41}Zr_{0.34}O_3$ | Gd: 0 | 45–50 | 3, 000–3, 500 | 0. 02–0. 03 | $10^8$ |
| G-B-2 | Same as above | Gd: 0. 1 | 35–40 | 10, 000–18, 000 | 0. 40–0. 50 | $10^4$–$10^6$ |
| G-B-3 | do | Gd: 0. 5 | 40–45 | 8, 000–13, 000 | 0. 10–0. 40 | $10^5$–$10^7$ |
| G-B-4 | do | Gd: 2. 0 | 45–50 | 5, 000–8, 000 | 0. 05–0. 10 | $10^7$–$10^8$ |
| G-B-5 | do | Gd: 5. 0 | 45–50 | 3, 500–4, 000 | 0. 04–0. 07 | $10^9$ |
| G-C-1 | $Pb(Mg_{1/3}Nb_{2/3})_{0.125}Ti_{0.43}Zr_{0.44}O_3$ | Gd: 0 | 50–55 | 2, 500–3, 000 | 0. 02–0. 03 | $10^{10}$ |
| G-C-2 | Same as above | Gd: 0. 1 | 40–45 | 9, 000–15, 000 | 0. 10–0. 30 | $10^5$–$10^6$ |
| G-C-3 | do | Gd: 0. 5 | 45–50 | 5, 000–8, 000 | 0. 10–0. 30 | $10^5$–$10^7$ |
| G-C-4 | do | Gd: 2. 0 | 45–50 | 3, 000–5, 000 | 0. 05–0. 10 | $10^8$–$10^9$ |
| G-C-5 | do | Gd: 5. 0 | 50–55 | 3, 000–3, 500 | 0. 04–0. 05 | $10^{10}$ |

TABLE 2

| Sample No. | Basic composition | Addition amount of additives, atomic percent | Planar coupling factor, percent | Electrostatic dielectric constant | Dielectric loss factor | Specific resistivity, Ω-cm. |
|---|---|---|---|---|---|---|
| B-A-1 | $Pb(Mg_{1/3}Nb_{2/3})_{0.375}Ti_{0.375}Zr_{0.25}O_3$ | Bi: 0. 1 | 25–35 | 8, 000–15, 000 | 0. 70–1. 0 | $10^3$–$10^4$ |
| B-A-2 | Same as above | Bi: 0. 5 | 30–40 | 7, 000–13, 000 | 0. 70–1. 0 | $10^4$–$10^5$ |
| B-A-3 | do | Bi: 2. 0 | 40–45 | 5, 000–10, 000 | 0. 50–0. 70 | $10^5$–$10^7$ |
| B-A-4 | do | Bi: 5. 0 | 45–50 | 2, 000–3, 000 | 0. 05–0. 07 | $\geq 10^9$ |
| B-B-1 | $Pb(Mg_{1/3}Nb_{2/3})_{0.25}Ti_{0.41}Zr_{0.34}O_3$ | Bi: 0. 1 | 30–35 | 7, 000–10, 000 | 0. 50–0. 70 | $10^4$–$10^5$ |
| B-B-2 | Same as above | Bi: 0. 5 | 35–40 | 5, 000–7, 000 | 0. 40–0. 50 | $10^5$–$10^6$ |
| B-B-3 | do | Bi: 2.0 | 40–45 | 3, 000–5, 000 | 0. 10–0. 15 | $10^7$–$10^9$ |
| B-B-4 | do | Bi: 5. 0 | 45–50 | 2, 000–2, 500 | 0. 02–0. 05 | $\geq 10^{10}$ |
| B-C-1 | $Pb(Mg_{1/3}Nb_{2/3})_{0.125}Ti_{0.435}Zr_{0.44}O_3$ | Bi: 0. 1 | 35–40 | 6, 000–7, 000 | 0. 30–0. 50 | $10^4$–$10^6$ |
| B-C-2 | Same as above | Bi: 0. 5 | 40–45 | 4, 000–6, 000 | 0. 20–0. 40 | $10^5$–$10^7$ |
| B-C-3 | do | Bi: 2. 0 | 45–50 | 2, 000–4, 000 | 0. 03–0. 05 | $10^7$–$10^9$ |
| B-C-4 | do | Bi: 5. 0 | 50–55 | 1, 500–2, 000 | 0. 02–0. 03 | $\geq 10^{11}$ |

TABLE 3

| Sample No. | Basic composition | Addition amount of additives, atomic percent | Planar coupling factor, percent | Electrostatic dielectric constant | Dielectric loss factor | Specific resistivity, Ω-cm. |
|---|---|---|---|---|---|---|
| S-A-1 | $Pb(Mg_{1/3}Nb_{2/3})_{0.375}Ti_{0.375}Zr_{0.25}O_3$ | Sb: 0. 1 | 30–35 | 10, 000–25, 000 | 0. 50–0. 70 | 10–$10^3$ |
| S-A-2 | Same as above | Sb: 0. 5 | 35–40 | 10, 000–20, 000 | 0. 50–0. 70 | $10^4$–$10^6$ |
| S-A-3 | do | Sb: 2. 0 | 40–45 | 8, 000–15, 000 | 0. 20–0. 50 | $10^6$–$10^7$ |
| S-A-4 | do | Sb: 5. 0 | 45–50 | 4, 000–5, 000 | 0. 10–0. 20 | $\geq 10^8$ |
| S-B-1 | $Pb(Mg_{1/3}Nb_{2/3})_{0.25}Ti_{0.41}Zr_{0.34}O_3$ | Sb: 0. 1 | 35–40 | 10, 000–18, 000 | 0. 40–0. 60 | $10^4$–$10^5$ |
| S-B-2 | Same as above | Sb: 0. 5 | 35–40 | 8, 000–13, 000 | 0. 20–0. 50 | $10^5$–$10^7$ |
| S-B-3 | do | Sb: 2. 0 | 40–45 | 5, 000–8, 000 | 0. 10–0. 29 | $10^7$–$10^8$ |
| S-B-4 | do | Sb: 5. 0 | 45–50 | 3, 500–4, 000 | 0. 04–0. 07 | $\geq 10^9$ |
| S-C-1 | $Pb(Mg_{1/3}Nb_{2/3})_{0.125}Ti_{0.435}Zr_{0.44}O_3$ | Sb: 0. 1 | 40–45 | 9, 000–15, 000 | 0. 10–0. 30 | $10^4$–$10^6$ |
| S-C-2 | Same as above | Sb: 0. 5 | 40–45 | 5, 000–8, 000 | 0. 20–0. 40 | $10^5$–$10^7$ |
| S-C-3 | do | Sb: 2. 0 | 45–50 | 3, 000–5, 000 | 0. 05–0. 10 | $10^7$–$10^9$ |
| S-C-4 | do | Sb: 5. 0 | 50–55 | 3, 000–3, 500 | 0. 04–0. 05 | $\geq 10^{10}$ |

TABLE 4

| Sample No.: | Firing atmosphere: Flowing gas, atomic pressure | Firing atmosphere: Flowing rate ml./min. | Planar coupling factor percent | Electrostatic dielectric constant | Dielectric loss factor | Specific resistivity, ω-cm. |
|---|---|---|---|---|---|---|
| G-A-3 | 0.15, $O_2$ plus 0.85,$N_2$ | 100 | 45-50 | 6,000-8,000 | 0.20-0.40 | $10^6$-$10^7$ |
| | 0.05, $O_2$ plus 0.95, $N_2$ | 50 | 45-50 | 10,000-15,000 | 0.30-0.50 | $10^5$-$10^6$ |
| | $N_2$ | 20 | 40-45 | 10,000-20,000 | 0.40-0.60 | $10^4$-$10^6$ |
| B-A-2 | 0.15, $O_2$ plus 0.85, $N_2$ | 100 | 40-45 | 4,000-8,000 | 0.40-0.70 | $10^5$-$10^6$ |
| | 0.05, $O_2$ plus 0.95, $N_2$ | 50 | 40-45 | 6,000-10,000 | 0.50-0.70 | $10^4$-$10^6$ |
| | $N_2$ | 20 | 30-40 | 7,000-13,000 | 0.70-1.0 | $10^4$-$10^5$ |
| S-A-4 | 0.15, $O_2$ plus 0.85, $N_2$ | 100 | 40-45 | 5,000-7,000 | 0.10-0.30 | $10^6$-$10^7$ |
| | 0.05, $O_2$ plus 0.95, $N_2$ | 50 | 40-45 | 10,000-15,000 | 0.20-0.50 | $10^5$-$10^6$ |
| | $N_2$ | 20 | 35-40 | 10,000-20,000 | 0.50-0.70 | $10^4$-$10^6$ |

What is claimed is:

1. An electromechanical transducer element comprising a semiconductor polycrystalline ceramic body consisting essentially of $Pb(Mg_{1/3}Mb_{2/3})_xTi_yZr_zO_3$ in which $x=0.125$ to 0.375, $y=0.375$ to 0.435 and $z=0.25$ to 0.44 and $x+y+z=1$, and 0.1 to 0.5 atomic percent of a metal selected from the group consisting of Gd, Sm, Nd, Ce, La, Bi and Sb which metal replaces an equivalent atomic percent of Pb, said ceramic body having a specific resistivity ranging from $10^3$–$10^7$ ohm-centimeter at room temperature.

2. A method of preparing an electromechanical transducer element having a semiconductive piezoelectric composition consisting essentially of $Pb(Mg_{1/3}Nb_{2/3})_xTi_yZr_zO_3$ in which $x=0.125$ to 0.375, $y=0.375$ to 0.435 and $z=0.25$ to 0.44 and $x+y+z=1$, and 0.1 to 0.5 atomic percent of a metal selected from the group consisting of Gd, Sm, Nd, Ce, La, Bi and Sb which metal replaces an equivalent atomic percent of Pb, which comprises heating a mixture of Pb, Mg, Nb, Ti and Zr oxides and an oxide selected from the group consisting of Gd, Sm, Nd, Ce, La, Bi and Sb oxides in proportions to produce said composition at a temperature of 1150° C. to 1350° C. for time period of 10 minutes to 3 hours in an atmosphere having an oxygen partial pressure less than 0.2 atmospheric pressure.

References Cited

UNITED STATES PATENTS

| | | | |
|---|---|---|---|
| 3,117,094 | 1/1964 | Roup et al. | 252—62.9 |
| 3,216,943 | 11/1965 | Jaffe et al. | 252—62.9 |
| 3,268,453 | 8/1966 | Ouchi et al. | 252—62.9 |
| 3,444,101 | 5/1969 | Viernickel | 252—62.9X |

TOBIAS E. LEVOW, Primary Examiner

J. COOPER, Assistant Examiner

U.S. Cl. X.R.

106—39; 352—520, 521